United States Patent
Cole et al.

(10) Patent No.: US 7,102,833 B2
(45) Date of Patent: Sep. 5, 2006

(54) METHOD AND APPARATUS FOR MAPPING IMAGE SHAPES FOR A DISPLAY DEVICE

(75) Inventors: James R Cole, Albany, OR (US); Michael A. Pate, Tuscon, AZ (US); Jon A. Brewster, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 10/734,714

(22) Filed: Dec. 12, 2003

(65) Prior Publication Data
US 2005/0128605 A1    Jun. 16, 2005

(51) Int. Cl.
G02B 9/00    (2006.01)
G02B 9/08    (2006.01)
G02B 27/10   (2006.01)
G03B 21/00   (2006.01)
G03B 21/14   (2006.01)

(52) U.S. Cl. .................. 359/738; 359/618; 353/37; 353/97

(58) Field of Classification Search ............... 359/726, 359/738–739, 885, 618; 353/31, 37, 84, 353/97; 362/583, 561, 26
See application file for complete search history.

(56) References Cited

U.S. PATENT DOCUMENTS

| | | | |
|---|---|---|---|
| 5,285,268 A | | 2/1994 | Nakagaki et al. |
| 5,978,051 A | * | 11/1999 | Gohman et al. ............ 348/766 |
| 6,341,876 B1 | | 1/2002 | Moss et al. |
| 6,577,380 B1 | | 6/2003 | Sposili et al. |
| 6,724,546 B1 | * | 4/2004 | Nishimae et al. ........... 359/739 |
| 6,771,325 B1 | * | 8/2004 | Dewald et al. ............. 348/743 |
| 6,773,116 B1 | * | 8/2004 | De Vaan et al. ............. 353/97 |
| 2001/0008470 A1 | | 7/2001 | Dewald |
| 2002/0036833 A1 | * | 3/2002 | Miyata et al. .............. 359/739 |
| 2002/0135862 A1 | | 9/2002 | Dewald |
| 2004/0227909 A1 | * | 11/2004 | Dahlgren ..................... 353/97 |

FOREIGN PATENT DOCUMENTS

| EP | 0 961 502 A2 | 12/1999 |
|---|---|---|
| EP | 1 496 709 A1 | 1/2005 |
| JP | 07281293 | * 10/1995 |

OTHER PUBLICATIONS

Dewald et al., "Sequential Color Recapture and Dynamic Filtering: A Method of Scrolling Color", SID 00 Digest, http://www.tij.co.jp/jrd/dlp/docs/technology/127_seq_dyn_filter.pdf (downloaded Mar. 15, 2003).

Chang et al., "Design of illumination and projection optics for projectors with single digital micromirror devices," Applied Optics, vol. 39, No. 19 (Jul. 1, 2000).

* cited by examiner

*Primary Examiner*—Alicia M Harrington

(57) ABSTRACT

An apparatus for mapping image shapes for a display device includes: an illuminating light source such as an integrating rod; a mechanism for selecting an image aspect ratio or shape; and a mechanism for reshaping light exiting from the illuminating light source depending upon the image aspect ratio or shape.

32 Claims, 5 Drawing Sheets

METHOD AND APPARATUS FOR MAPPING IMAGE SHAPES FOR A DISPLAY DEVICE

BACKGROUND OF THE INVENTION

Digital projectors are typically constructed with spatial light modulators (e.g., digital mirror devices (DMDs) or liquid crystal displays (LCDs)) that have a fixed number of pixels, resulting in a fixed aspect ratio. However, video content is available in several different aspect ratios, and when video content is displayed using a light modulator with a mismatched aspect ratio, some of the pixels on the light modulator are not used. In other words, these pixels stay in their "off" state, and the light that would normally be used to illuminate these pixels is wasted.

By way of example, a typical digital projector has a DMD array with 1024×768 square pixels, providing an image with a 4:3 aspect ratio. HDTV content has a 16:9 aspect ratio (for example, 1920×1080). When HDTV content is scaled to fit by matching the width, approximately 25% of the pixels are not used. This also means that about 25% of the total lumens available are not used. Similar issues arise if the mirror array has a 16:9 aspect ratio, but the video content has a 4:3 aspect ratio. Another aspect ratio that is used in computer graphics displays is 5:4, resulting in other mismatches.

Thus, when digital projectors show video content that has a different aspect ratio than the light modulator used to form the image, some light is wasted. For light modulators and video content with mismatched aspect ratios, it would be desirable to be able to at least partially "recover" this lost light and increase the brightness of the image. It would also be desirable to be able to improve the apparent and/or actual contrast ratio between used and unused portions of a light modulator.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense, but is made merely for the purpose of illustrating the general principles of the invention.

Figure 1:
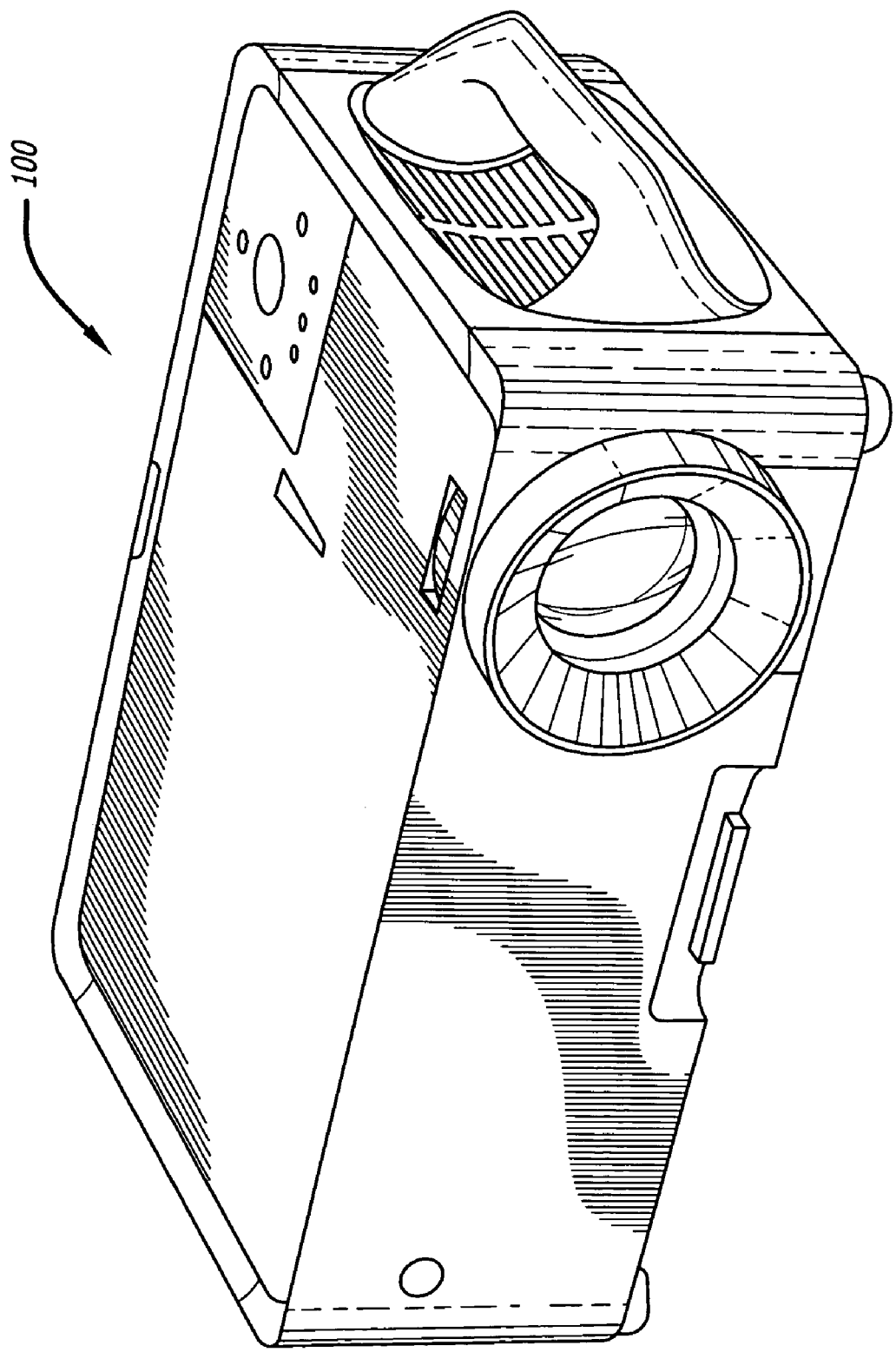
FIG. 1 is a perspective view of an example display device according to an embodiment of the present invention.

The principles of the present invention are applicable to any display device including, but not limited to, digital display devices with spatial light modulators, front- and rear-projection systems, etc. By way of example, FIG. 1 shows an example display device 100 (a digital projector) configured according to principles of the present invention as described herein.

Methods and apparatuses according to the present invention provide an exit aperture that has a "correct" aspect ratio, i.e., an exit aperture aspect ratio that matches the aspect ratio of video content displayed using a particular light modulator. Various embodiments of the present invention result in at least a partial "recovery" of light that would have otherwise been lost due to mismatched aspect ratios, potentially increasing the brightness of the image. Employing methods and apparatuses of the present invention, it has been observed that contrast ratios appear to improve, with unused portions of displays appearing darker and hence less visible.

According to an embodiment of the present invention, a method for using a display device including a light modulator includes identifying an active area aspect ratio or shape for an image to be projected by the display device, and repositioning one or more components of the display device to occlude portions of the light modulator depending upon the active area aspect ratio or shape. It should be appreciated however that the principles of the present invention are not limited to active areas that are rectangular (e.g., 4:3, 16:9 and other aspect ratios); rather the active areas can have other shapes, for example, shapes suitable for keystoning.

The active area aspect ratio or shape can be identified in a variety of different ways. The video media, data within the video content and/or information associated with the video content can provide information identifying the nature of the active area, facilitating automatic identification of an active area aspect ratio or shape. Display devices according to the present invention can also be configured to allow a user to manually select or designate an active area aspect ratio or shape, or to override an automatically identified active area aspect ratio or shape.

According to the present invention, light exiting from the light modulator can be reshaped in a variety of different ways. For example, display devices according to the present invention can be configured with one or more components that can be repositioned to occlude portions of the light modulator depending upon the active area aspect ratio or shape. Generally, these components function as a mechanism for providing a variable exit aperture to the light modulator. By way of example, the one or more components can take the form of a member (e.g., an opaque member) formed with a plurality of differently shaped apertures, the member being configured to be repositionable relative to an exit of an integrating rod in a display device. Also, by way of example, the one or more components can take the form of a plurality of members (e.g., opaque members) that are repositionable relative to an exit of an integrating rod in a display device. Additionally, the one or more components can take the form of one or more anamorphic lens positioned at an exit of an integrating rod in a display device. Rather than occluding portions of the light modulator, the one or more anamorphic lens transform light exiting the integrating rod.

Figure 2:
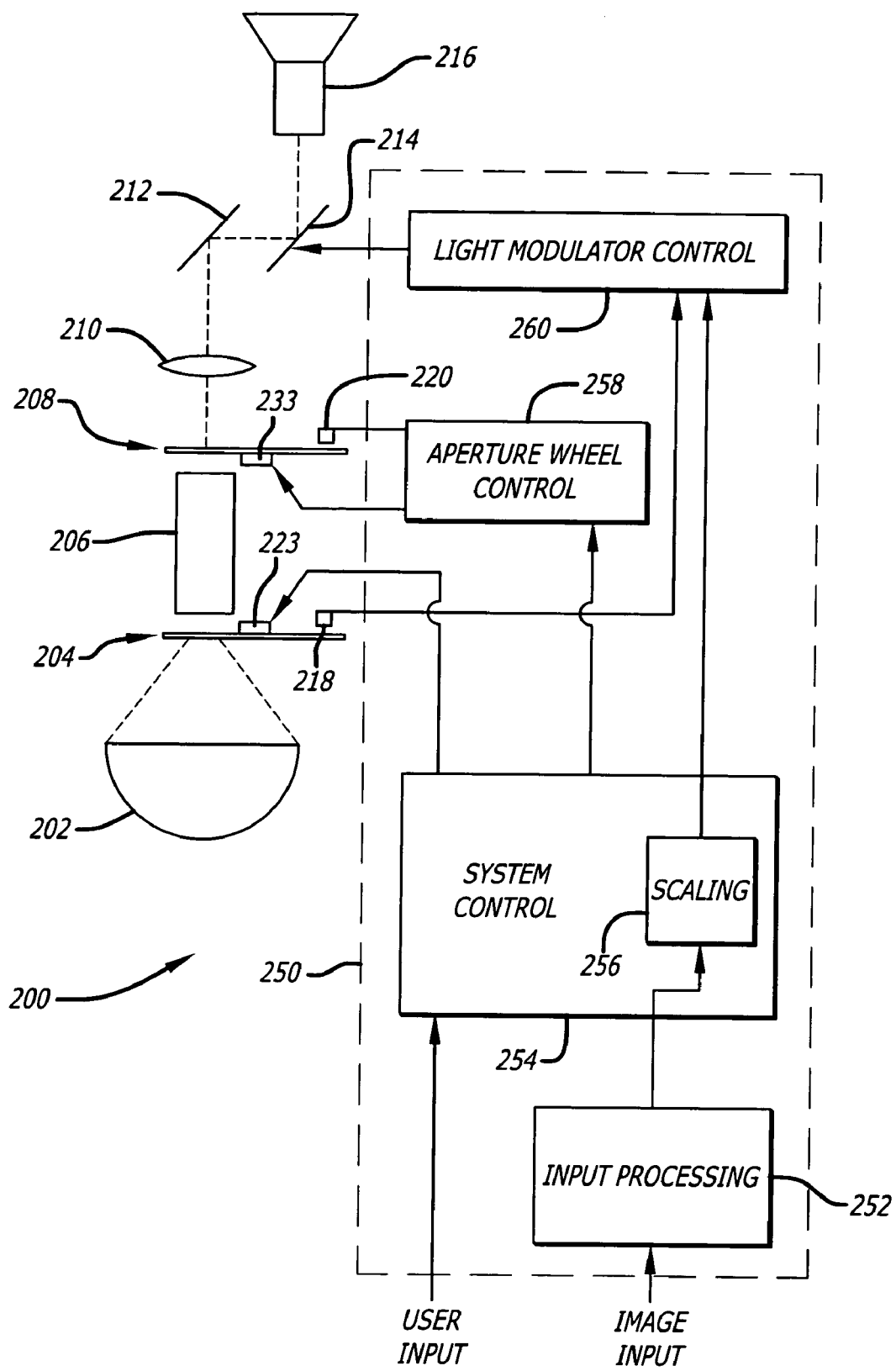
FIG. 2 is a functional diagram of an example display device according to an embodiment of the present invention.

Referring to FIG. 2, a display device 200 according to an embodiment of the present invention includes a lamp (or bulb) 202, a color wheel 204, an integrating rod 206, a variable aperture wheel 208, illumination optics 210, a mirror 212, a light modulator 214, projection optics 216, a color wheel sensor 218, an aperture wheel sensor 220 and a controller 250 (shown in dashed lines) configured as shown.

Figure 3:
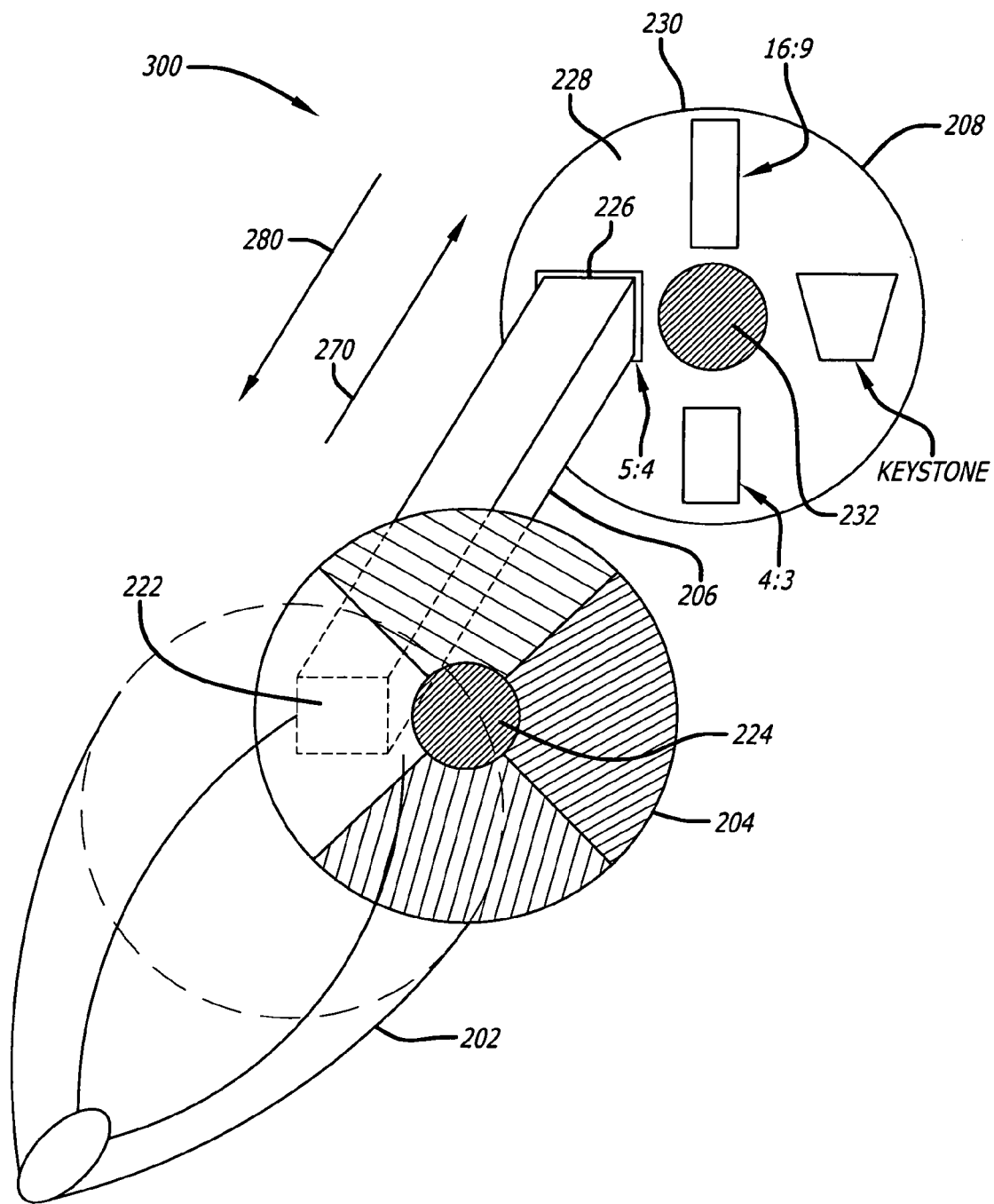
FIG. 3 is a perspective view of an example wheel apparatus for selectively obstructing portions of an exit of an integrating rod according to an embodiment of the present invention.

FIG. 3 shows some of the components of the display device 200, namely, a subsystem 300 which includes the lamp 202, the color wheel 204, the integrating rod 206, and the variable aperture wheel 208. The color wheel 204 is positioned as shown between the lamp 202 and an entrance 222 of the integrating rod 206. Generally, the color wheel 204 includes multiple pieces of dichroic-coated glass arranged in arc segments (in this example, four segments) mounted to a motor 223. By way of example, the segments include three color segments for sequentially separating red, green and blue wavelengths and a white segment (for example, a section of anti-reflection coated glass) for boosting lumens projected to the screen. It should be appreciated that color wheels containing different numbers of segments, different segment color combinations, different arrangements of segments, etc. can also be used. Movement of the color wheel 204 about a rotational axis 224 is controlled in a convention fashion.

The integrating rod 206 also includes an exit 226 which faces the variable aperture wheel 208 as shown. In this example, the exit 226 of the integrating rod 206 has a generally rectangular shape with an aspect ratio of 5:4. It should be appreciated, however, that this is merely one example of the types of integrating rods that can be configured to operate in conjunction with a mechanism for reshaping light exiting from the integrating rod 206 depending upon a selected image aspect ratio or shape. Moreover, the principles of the present invention are equally applicable to illuminating light sources, light pipes, etc. other than integrating rods.

In this example embodiment, the mechanism for reshaping light exiting from the integrating rod 206 is provided by the variable aperture wheel 208. The example variable aperture wheel 208 includes a plurality of differently shaped apertures, namely, apertures having a 4:3 aspect ratio, a 5:4 aspect ratio, a 16:9 aspect ratio, and a keystone shape, respectively. In this example embodiment, the variable aperture wheel 208 is opaque and generally circular in shape and includes a surface 228 that faces the exit 226 of the integrating rod 206, and the apertures are positioned adjacent a periphery 230 of the opaque member.

In this example embodiment, the variable aperture wheel 208 is repositioned relative to the exit 226 of the integrating rod 206 via movement of the variable aperture wheel 208 about a rotational axis 232. Movement of the variable aperture wheel 208 is controlled depending upon a selected image aspect ratio or shape. For example, a motor 233 is used to control rotation of the variable aperture wheel 208 to position an aperture on the variable aperture wheel 208 that corresponds to the selected image aspect ratio or shape adjacent the exit 226 of the integrating rod 206. Depending upon the size and shape of the aperture positioned adjacent the exit 226, the variable aperture wheel 208 may or may not occlude a portion of light exiting from the integrating rod 206.

Figures 5A, 5B, 5C:
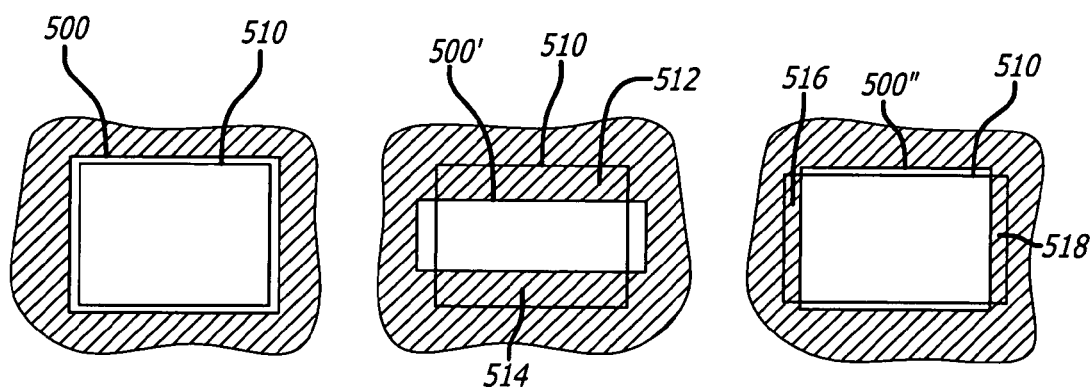
FIGS. 5A–5C show examples of different active area mappings according to various embodiments of the present invention.

FIG. 5A shows an example of using an aperture 500 to map a 4:3 aspect ratio image active area onto a 4:3 aspect ratio light modulator 510. In this example, the aperture 500 is shaped and sized such that none of the 4:3 aspect ratio light modulator 510 is occluded when the aperture 500 and the 4:3 aspect ratio light modulator 510 are properly aligned. FIG. 5B shows an example of using an aperture 500' to map a 16:9 aspect ratio image active area onto a 4:3 aspect ratio light modulator 510. In this example, the aperture 500' is shaped and sized such that portions 512 and 514 of the 4:3 aspect ratio light modulator 510 are occluded when the aperture 500' and the 4:3 aspect ratio light modulator 510 are properly aligned. The aperture 500' extends beyond the left and right boundaries of the 4:3 aspect ratio light modulator 510 to accommodate mechanical tolerances. FIG. 5C shows an example of using an aperture 500" to map a 5:4 aspect ratio image active area onto a 4:3 aspect ratio light modulator 510. In this example, the aperture 500" is shaped and sized such that portions 516 and 518 of the 4:3 aspect ratio light modulator 510 are occluded when the aperture 500" and the 4:3 aspect ratio light modulator 510 are properly aligned. The aperture 500' extends beyond the top and bottom boundaries of the 4:3 aspect ratio light modulator 510 to accommodate mechanical tolerances.

According to the present invention, and referring again to FIG. 3, the surface 228 of the variable aperture wheel 208 can be light reflecting (e.g., mirrored) and/or light absorbing (e.g., black). In various "light recycling" embodiments, part or all of the surface 228 is light reflecting: By positioning such a light reflecting surface over a portion of the exit 226, a corresponding portion of the light modulator array is occluded (i.e., not illuminated) and light propagating along the direction of the nominal light path (indicated by arrow 270) and incident upon the surface 228 is reflected back through the integrating rod 206 along the retroreflected light direction (indicated by arrow 280) towards the lamp 202. Some of this light may be reflected back from the lamp 202, re-enter the integrating rod 206, and possibly exit out the "active" part of the exit 226.

Figure 4:
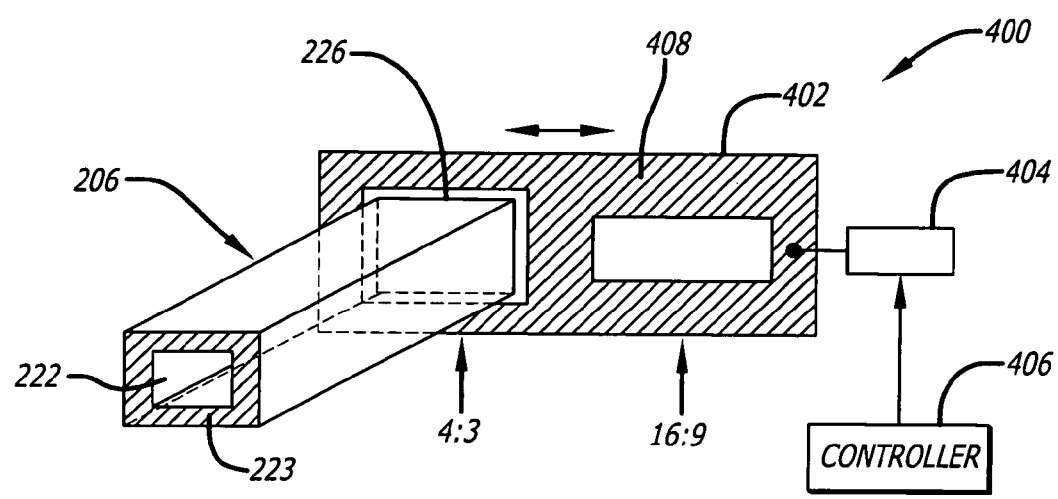
FIG. 4 is a perspective view of an example plate apparatus for selectively obstructing portions of an exit of an integrating rod according to another embodiment of the present invention.

In this example embodiment, the entrance 222 of the integrating rod 206 is fully open and does not have an aperture. However, it should be appreciated that the integrating rod 206 can have a fully open entrance or a partially open entrance (in the later case, as shown in FIG. 4, with or without a reflective or partially reflective surface 223 facing the exit 226 of the integrating rod 206). By way of example, a partially reflective element can be provided at the entrance 222 of the integrating rod 206, similar to sequential color recapture (SCR) systems. Depending on the recycling efficiency, the result may be a brighter image.

In various other embodiments, part or all of the surface 228 of the variable aperture wheel 208 is light absorbing. When the entrance 222 of the integrating rod 206 is fully open, i.e., no entrance aperture, and the surface 228 of the variable aperture wheel 208 is light absorbing, unused portions of the image may appear darker thereby improving the apparent contrast ratio. Moreover, the attendant reduction in stray light in the system may improve the actual contrast ratio.

Referring again to FIG. 2, the controller 250 can be realized via one or more controllers/processors, firmware and/or software. As shown in this example embodiment, the controller 250 is configured to provide the following functions: input processing 252, system control 254, scaling 256, aperture wheel control 258, and light modulator control 260. With respect to input processing 252, the controller 250 is configured to receive and process image input or data for synchronization of operation with the other controller functions. To this end, system control 254 includes providing the motor 223 for the color wheel 204 with control/drive signals, aperture wheel control 258 includes providing the motor 233 for the variable aperture wheel 208 with control/drive signals, and light modulator control 260 includes providing control signals to the light modulator 214. The sensors 218 and 220 are configured (employing optical encoding technology or otherwise) to monitor motion of the color wheel 204 and the variable aperture wheel 208, respectively, and to generate positional or other feedback signals. By way of example, the scaling 256 can include: digital scaling of RGB computer signals (VGA to SXGA resolutions) to XGA, or digital de-interlacing of STV, DTV and HDTV formats.

In various embodiments of the present invention, input processing 252 also includes processing the image input or other data to automatically select an image aspect ratio or shape without intervention by a user of the display device 200. Thus, according to an embodiment of the present invention, a method for using a display device including a light modulator includes identifying an active area aspect ratio or shape for an image to be projected by the display device, and providing to the display device an input signal that initiates automatic mapping by the display device of the active area aspect ratio or shape onto the light modulator.

In various embodiments of the present invention, the processor 250 is configured to allow a user to manually select or designate an active area aspect ratio or shape, or to override an automatically identified active area aspect ratio or shape. To this end, a user input is provided to the system control 254 which, in turn, provides control signals to the aperture wheel control 258.

According to the present invention, apparatuses for selectively reshaping light exiting from an integrating rod or illuminating light source can take many forms. Thus, the variable aperture wheel 208 can have different numbers of apertures, different shapes of apertures, different arrangements of apertures, etc. than shown in this example embodiment. Moreover, such apparatuses are not limited to wheel-shaped objects. Nor are they limited to opaque structures or structures that include apertures.

Referring to FIG. 4, an integrating rod 206 is shown operatively engaged with a mechanism 400 for selectively obstructing portions of the exit 226 (4:3 aspect ratio) of the integrating rod 206. As discussed above, in this example embodiment, the entrance 222 of the integrating rod 206 is partially open. Alternatively, the entrance can be fully open. It should also be appreciated that example embodiments shown with a fully open entrance aperture can alternatively be provided with a partially open entrance aperture.

The example mechanism 400 includes a plate 402 with a plurality of differently shaped apertures, an actuator mechanism 404, and a controller 406 configured as shown. In this example, the plate 402 includes a 4:3 aspect ratio aperture and a 16:9 aspect ratio aperture formed as shown. The plate 402, typically an opaque object, includes a surface 408 facing the exit 226 of the integrating rod 206. The surface 408 can be light reflecting and/or light-absorbing as discussed above with respect to the variable aperture wheel 208. The actuator mechanism 404, by way of example, a linear actuator, receives control/drive signals from the controller 406. As with the prior described embodiment, the controller 406 provides control signals depending upon an identified or selected aspect ratio or shape for an image to be projected by the display device.

Thus, according to an embodiment of the present invention, a method of mapping images for a display device with an integrating rod includes identifying an aspect ratio or shape for an image to be projected by the display device, and positioning an object with a plurality of differently shaped and/or sized apertures adjacent an exit of the integrating rod depending upon the aspect ratio or shape to selectively obstruct portions of the exit of the integrating rod.

Figure 6A:
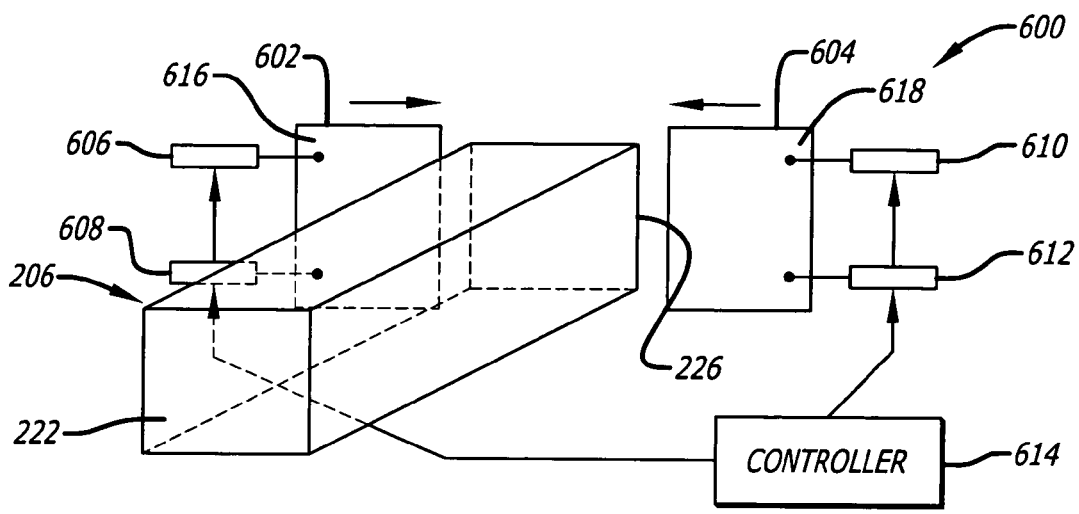
FIGS. 6A and 6B show perspective views of an example articulated apparatus for selectively obstructing portions of an exit of an integrating rod according to another embodiment of the present invention.
Figure 6B:
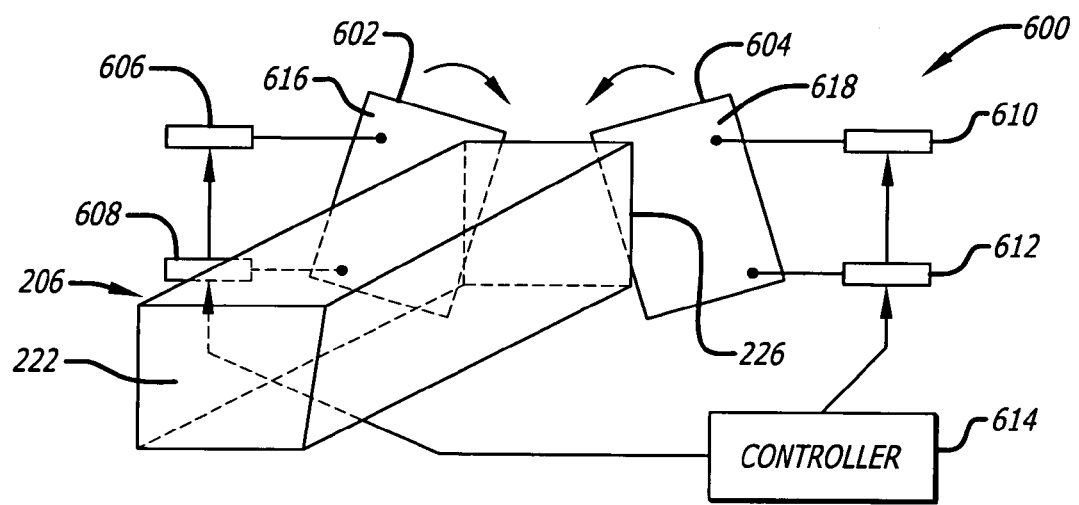

Referring to FIGS. 6A and 6B, an integrating rod 206 is shown operatively engaged with a mechanism 600 for selectively obstructing portions of the exit 226 of the integrating rod 206. The example mechanism 600 includes plates 602 and 604, actuator mechanisms 606, 608, 610 and 612, and a controller 614 configured as shown. The plates 602 and 604, typically opaque objects, respectively include surfaces 616 and 618 facing the exit 226 of the integrating rod 206. The surfaces 616 and 618 can be light reflecting and/or light-absorbing as discussed above with respect to the variable aperture wheel 208. The actuator mechanisms 606, 608, 610 and 612, by way of example, linear actuators, receive control/drive signals from the controller 606. As with the prior described embodiments, the controller 606 provides control signals depending upon an identified or selected aspect ratio or shape for an image to be projected by the display device. FIG. 6A illustrates how the actuator mechanisms 606, 608, 610 and 612 can be controlled in a symmetrical fashion to occlude portions of the light modulator in a rectangular shape. FIG. 6B illustrates how the actuator mechanisms 606, 608, 610 and 612 can be controlled in an asymmetrical fashion to occlude portions of the light modulator in a keystone or other non-rectangular shape.

Thus, according to an embodiment of the present invention, a method of mapping images for a display device with an integrating rod includes identifying an aspect ratio or shape for an image to be projected by the display device, and positioning a plurality of objects adjacent an exit of the integrating rod depending upon the aspect ratio or shape to selectively obstruct portions of the exit of the integrating rod.

Figure 7:
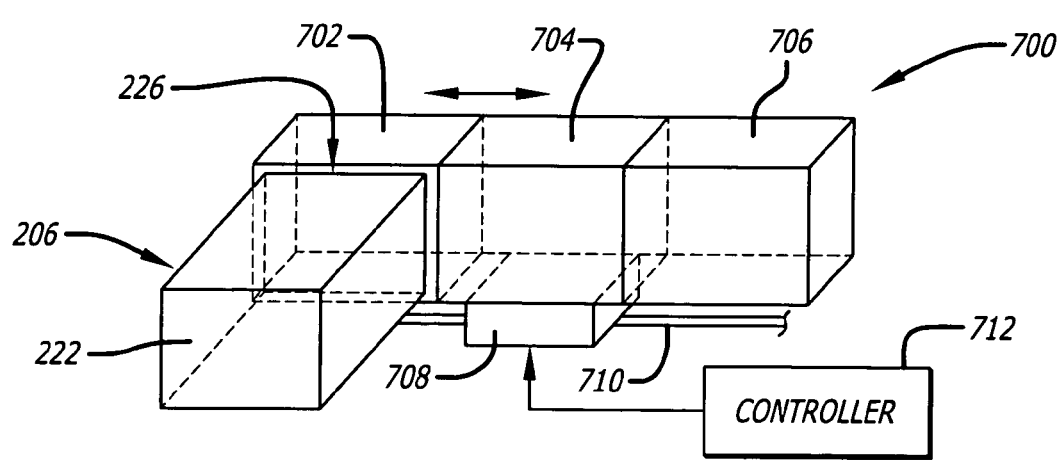
FIG. 7 shows a perspective view of an example anamorphic lens apparatus for reshaping the light field from an exit of an integrating rod to a current/desired aspect ratio or shape according to another embodiment of the present invention.

Referring to FIG. 7, an integrating rod 206 is shown operatively engaged with a mechanism 700 for reshaping the light field from the exit 226 of the integrating rod 206 to a current/desired aspect ratio or shape. The example mechanism 700 includes a plurality of different anamorphic lenses 702, 704 and 706, a motor 708 that moves along a track 710, and a controller 712. The motor 708 (e.g., a servo motor) is mechanically coupled to the anamorphic lenses 702, 704 and 706 as shown, receives control/drive signals from the controller 712, and functions to position one of the anamorphic lenses 702, 704 and 706 facing the exit 226 of the integrating rod 206. The positioning of an anamorphic lens at the exit of the integrating rod may, under some circumstances, improve gain. Moreover, employment of the plurality of anamorphic lenses in a modular fashion as shown herein facilitates easier modifications of systems to meet different light reshaping requirements. As with the prior described embodiments, the controller 712 provides control signals depending upon an identified or selected aspect ratio or shape for an image to be projected by the display device. It should also be appreciated that alternative transport mechanisms for the motors and actuators disclosed herein can be employed within the scope of the present invention.

Thus, according to various embodiments of the present invention, an apparatus for mapping image shapes for a display device includes an illuminating light source, a mechanism for selecting an image aspect ratio or shape, and a mechanism for reshaping light exiting from the illuminating light source depending upon the image aspect ratio or shape.

According to various embodiments of the present invention, an apparatus for mapping image shapes for a display device includes an integrating rod, a mechanism for selecting an image aspect ratio or shape, and a mechanism for reshaping light exiting from the integrating rod depending upon the image aspect ratio or shape. The integrating rod can have a fully open entrance or a partially open entrance (in the later case, with or without a reflective or partially reflective surface facing the exit of the integrating rod). The mechanism for selecting an image aspect ratio or shape can include an image processor. The mechanism for selecting can be configured to automatically select an image aspect ratio or shape without intervention by a user of the display device and/or to select an image aspect ratio or shape in response to an input provided by a user of the display device. The mechanism for reshaping light exiting from the integrating rod can include a member with a plurality of differently shaped apertures formed therethrough. The member can include a light reflecting surface and/or a light absorbing surface facing an exit of the integrating rod. The mechanism for reshaping can include a mechanism for positioning the member adjacent an exit of the integrating rod depending upon the image aspect ratio or shape. In various embodiments, the apertures are positioned adjacent a periphery of the member. By way of example, the periphery of the member can be (but does not have to be) generally circular in shape. Alternatively, the mechanism for reshaping can include a plurality of members and a mechanism for positioning the members adjacent an exit of the integrating rod depending upon the image aspect ratio or shape. The mechanism for positioning the members can be configured to provide a variable aperture adjacent the exit of the integrating rod depending upon the image aspect ratio or shape. The members can include light reflecting surfaces and/or light absorbing surfaces facing an exit of the integrating rod. Alternatively, the mechanism for reshaping can include an anamorphic lens selected and positioned adjacent an exit of the integrating rod depending upon the image aspect ratio or shape.

According to various embodiments of the present invention, a display device includes a light source, a light modulator, a projection lens adjacent the light modulator, an integrating rod adjacent the light source, and a variable exit aperture operatively positioned between the integrating rod and the light modulator. The variable exit aperture is configured for mapping one of a plurality of different image aspect ratios or shapes onto the light modulator. The display device can also include a mechanism for selecting one of the plurality of different image aspect ratios or shapes. The integrating rod can have a fully open entrance or a partially open entrance (in the later case, with or without a reflective or partially reflective surface facing the exit of the integrating rod). The variable exit aperture can be provided by one or more members. The one or more members can include light reflecting surfaces and/or light absorbing surfaces facing an exit of the integrating rod. The variable exit aperture can include a mechanism for positioning the one or more members adjacent an exit of the integrating rod depending upon a selected image aspect ratio or shape. Alternatively, the variable exit aperture can be provided by an anamorphic lens selected and positioned adjacent an exit of the integrating rod depending upon a selected image aspect ratio or shape. The mechanism for selecting one of the plurality of different image aspect ratios or shapes can include an image processor. The mechanism for selecting can be configured to automatically select an image aspect ratio or shape without intervention by a user of the display device and/or to select an image aspect ratio or shape in response to an input provided by a user of the display device.

Although the present invention has been described in terms of the example embodiments above, numerous modifications and/or additions to the above-described embodiments would be readily apparent to one skilled in the art. It is intended that the scope of the present invention extends to all such modifications and/or additions.

We claim:

1. An apparatus for mapping image shapes for a display device, comprising:
   an integrating rod;
   means for selecting an image aspect ratio or shape; and
   means for reshaping light exiting from the integrating rod depending upon the image aspect ratio or shape;
   wherein the means for selecting is configured to select an image aspect ratio or shape in response to an input provided by a user of the display device.

2. The apparatus for mapping image shapes for a display device of claim 1, wherein the integrating rod has a fully open entrance.

3. The apparatus for mapping image shapes for a display device of claim 1, wherein the integrating rod has a partially open entrance.

4. The apparatus for mapping image shapes for a display device of claim 3, wherein the integrating rod has an exit and the partially open entrance has a reflective surface facing the exit.

5. The apparatus for mapping image shapes for a display device of claim 3, wherein the integrating rod has an exit and the partially open entrance has a partially reflective surface facing the exit.

6. The apparatus for mapping image shapes for a display device of claim 1, wherein the means for selecting includes an image processor.

7. The apparatus for mapping image shapes for a display device of claim 1, wherein the means for selecting is configured to automatically select an image aspect ratio or shape without intervention by a user of the display device.

8. An apparatus for mapping image shapes for a display device, comprising:
   an integrating rod;
   means for selecting an image aspect ratio or shape; and
   means for reshaping light exiting from the integrating rod depending upon the image aspect ratio or shape;
   wherein the means for reshaping includes a member with a plurality of differently shaped apertures formed therethrough.

9. The apparatus for mapping image shapes for a display device of claim 8, wherein the member includes a light reflecting surface facing an exit of the integrating rod.

10. The apparatus for mapping image shapes for a display device of claim 8, wherein the member includes a light absorbing surface facing an exit of the integrating rod.

11. The apparatus for mapping image shapes for a display device of claim 8, wherein the means for reshaping includes means for positioning the member adjacent an exit of the integrating rod depending upon the image aspect ratio or shape.

12. The apparatus for mapping image shapes for a display device of claim 8, wherein the apertures are positioned adjacent a periphery of the member.

13. The apparatus for mapping image shapes for a display device of claim 12, wherein the periphery of the member is generally circular in shape.

14. An apparatus for mapping image shapes for a display device, comprising:
    an integrating rod;
    means for selecting an image aspect ratio or shape; and means for reshaping light exiting from the integrating rod depending upon the image aspect ratio or shape;

wherein the means for reshaping includes a plurality of members and means for positioning the members adjacent an exit of the integrating rod depending upon the image aspect ratio or shape.

15. The apparatus for mapping image shapes for a display device of claim 14, wherein the means for positioning the members is configured to provide a variable aperture adjacent the exit of the integrating rod depending upon the image aspect ratio or shape.

16. The apparatus for mapping image shapes for a display device of claim 14, wherein the members include light reflecting surfaces facing an exit of the integrating rod.

17. The apparatus for mapping image shapes for a display device of claim 14, wherein the members include light absorbing surfaces facing an exit of the integrating rod.

18. An apparatus for mapping image shapes for a display device, comprising:
an integrating rod;
means for selecting an image aspect ratio or shape; and
means for reshaping light exiting from the integrating rod depending upon the image aspect ratio or shape;
wherein the means for reshaping includes an anamorphic lens selected and positioned adjacent an exit of the integrating rod depending upon the image aspect ratio or shape.

19. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the integrating rod has a partially open entrance.

20. The display device of claim 19, wherein the integrating rod has an exit and the partially open entrance has a reflective surface facing the exit.

21. The display device of claim 19, wherein the integrating rod has an exit and the partially open entrance has a partially reflective surface facing the exit.

22. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the variable exit aperture is provided by one or more members which include a light reflecting surface facing an exit of the integrating rod.

23. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the variable exit aperture is provided by one or more members which include a light absorbing surface facing an exit of the integrating rod.

24. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the variable exit aperture is provided by one or more members and includes means for positioning the one or more members adjacent an exit of the integrating rod depending upon a selected image aspect ratio or shape.

25. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the variable exit aperture is provided by an anamorphic lens selected and positioned adjacent an exit of the integrating rod depending upon a selected image aspect ratio or shape.

26. A display device, comprising:
a light source;
a light modulator;
a projection lens adjacent the light modulator;
an integrating rod adjacent the light source;
a variable exit aperture operatively positioned between the integrating rod and the light modulator, the variable exit aperture being configured for mapping one of a plurality of different image aspect ratios or shapes onto the light modulator; and
means for selecting one of the plurality of different image aspect ratios or shapes;
wherein the means for selecting is configured to select an image aspect ratio or shape in response to an input provided by a user of the display device.

27. The display device of claim 26, wherein the integrating rod has a fully open entrance.

28. The display device of claim 26, wherein the variable exit aperture is provided by one or more members.

29. The display device of claim 26, wherein the means for selecting includes an image processor.

30. The display device of claim 26, wherein the means for selecting is configured to automatically select an image aspect ratio or shape without intervention by a user of the display device.

31. A method of mapping images for a display device with an integrating rod, comprising:
- identifying an aspect ratio or shape for an image to be projected by the display device; and
- positioning an object with a plurality of differently shaped and/or sized apertures adjacent an exit of the integrating rod depending upon the aspect ratio or shape to selectively obstruct portions of the exit of the integrating rod.

32. A method of mapping images for a display device with an integrating rod, comprising:
- identifying an aspect ratio or shape for an image to be projected by the display device; and
- positioning a plurality of objects adjacent an exit of the integrating rod depending upon the aspect ratio or shape to selectively obstruct portions of the exit of the integrating rod.

* * * * *